United States Patent
Pedersen et al.

(10) Patent No.: US 8,619,823 B2
(45) Date of Patent: Dec. 31, 2013

(54) SYSTEM, DEVICE AND METHOD FOR EXTENDING THE LIFE-TIME OF AN OPTICAL SYSTEM

(75) Inventors: Morten Ostergaard Pedersen, Risskov (DK); Thomas Vestergaard Andersen, Frederiksberg C (DK)

(73) Assignee: NKT Photonics A/S, Birkerod (DK)

( * ) Notice: Subject to any disclaimer, the term of this patent is extended or adjusted under 35 U.S.C. 154(b) by 495 days.

(21) Appl. No.: 12/865,489

(22) PCT Filed: Feb. 2, 2009

(86) PCT No.: PCT/DK2009/000025
§ 371 (c)(1),
(2), (4) Date: Aug. 26, 2010

(87) PCT Pub. No.: WO2009/095022
PCT Pub. Date: Aug. 6, 2009

(65) Prior Publication Data
US 2011/0019701 A1    Jan. 27, 2011

(30) Foreign Application Priority Data
Jan. 31, 2008   (DK) .................................. 2008 00142

(51) Int. Cl.
*H01S 3/121*   (2006.01)
(52) U.S. Cl.
USPC .............................................. 372/14; 372/21
(58) Field of Classification Search
USPC .......................................................... 372/14
See application file for complete search history.

(56) References Cited

U.S. PATENT DOCUMENTS

| | | | |
|---|---|---|---|
| 4,910,737 A * | 3/1990 | Payne et al. ........................ | 372/6 |
| 5,179,562 A | 1/1993 | Marason et al. | |
| 5,677,920 A * | 10/1997 | Waarts et al. ...................... | 372/6 |
| 6,507,593 B1 * | 1/2003 | Spinelli et al. ................... | 372/20 |
| 6,775,447 B2 * | 8/2004 | Nicholson et al. ............. | 385/122 |
| 2002/0021730 A1 | 2/2002 | Schroeder et al. | |
| 2002/0034004 A1 | 3/2002 | Khoshnevis et al. | |
| 2003/0072523 A1* | 4/2003 | Lin et al. ......................... | 385/31 |
| 2004/0001523 A1 | 1/2004 | Holsinger et al. | |
| 2006/0072635 A1 | 4/2006 | Wang | |

FOREIGN PATENT DOCUMENTS

| | | | |
|---|---|---|---|
| CN | 100511881 | * | 1/2008 |
| CN | 101102033 | | 1/2008 |
| EP | 1 445 634 | | 8/2004 |
| WO | WO 00/37974 | | 6/2000 |
| WO | WO 2005/062113 | | 7/2005 |

OTHER PUBLICATIONS

International-Type Search Report (Form PCT/ISA 210) dated Nov. 25, 2008, issued in the corresponding European National Application No. 2008/0142.

(Continued)

*Primary Examiner* — Xinning Niu
(74) *Attorney, Agent, or Firm* — Buchanan Ingersoll & Rooney PC (57) ABSTRACT

The invention relates to an optical system arranged to provide an output which, in operation, comprises at least one figure of merit, Q. The system comprises an optical component having multiple working areas, said component being mounted on a support member. The system further comprises an optical beam path arranged to bring light into interaction with at least one working area of the optical component wherein the position of said working area(s) may be selected by relative movement between said path and said component while keeping Q substantially unaffected by said movement.

21 Claims, 9 Drawing Sheets

(56) References Cited

OTHER PUBLICATIONS

International Search Report (Form PCT/ISA/210) and the Written Opinion of the International Searching Authority (Form PCT/ISA/237) dated Jan. 25, 2010, issued in the corresponding European International Application No. PCT/DK2009/000025.
Denmark communication dated Sep. 18, 2008, issued in the corresponding Denmark Application No. PA 2008 00142.
Andersen et al., U.S. Appl. No. 12/808,327, entitled "Mode-locked Fiber Laser with Improved Life-time of Saturable Absorber" filed Aug. 3, 2010.
Bjarklev et al., "Photonic Crystal Fibres" Kluwer Academic Press, 2003, Chapter 4, pp. 115-130.
Knight et al., "All-Silica Single-Mode Optical Fiber with Photonic Crystal Cladding" Optics Letters, 1996, vol. 21, No. 19, pp. 1547-1549.

* cited by examiner

SYSTEM, DEVICE AND METHOD FOR EXTENDING THE LIFE-TIME OF AN OPTICAL SYSTEM

TECHNICAL FIELD

The invention relates to an optical system device and method for extending the life-time of an optical system. In one embodiment the invention relates to a optical system arranged to provide an output which, in operation, comprises at least one figure of merit, Q, said system being or comprising a laser source comprising a cavity comprising a reflecting optical component having multiple working areas, said component being mounted on a support member, said system further comprising an optical beam path arranged to bring light into interaction with at least one working area of the optical component.

BACKGROUND

The commercial application of an optical system often hinges on the life-time of the system and thereby the life-time of each component. In this context life-time is often measured in the number of operational hours before failure or before performance drops below a specified level. Depending on the application components are exchanged well before expiration of their life-time to ensure continuous high performance of the system. Some systems may monitor the performance in order to determine when one or more components should be exchanged. In either case an exchange of components may be costly, as it will often require the visit of a service technician or shipping the system to a repair facility.

SUMMARY OF THE INVENTION

The invention described herein solves the above problems and provides the desirable features described in the previous section.

In one embodiment the invention relates to an optical system arranged to provide an output which, in operation, comprises at least one figure of merit, Q, said system being or comprising a laser source comprising a cavity comprising a reflecting optical component forming part of said cavity, said component having multiple working areas, said component being mounted on a support member, said system further comprising an optical beam path arranged to bring light into interaction with at least one working area of the optical component wherein the position of said working area(s) may be selected by relative movement between said optical beam path and said component while keeping Q substantially unaffected by said movement. In this way the invention provides a solution for systems where the lifetime of the system is at least partly limited by the lifetime of a component with multiple working areas. Such systems are often systems where the said component is exposed to relatively high optical intensity. In the remaining text the term "the optical component" refers to said optical component with multiple working areas unless otherwise clear from the description. While this implies the assumption that the optical system comprises a single optical component with multiple working areas this should not be taken as an indication of the invention being limited to optical systems with a single component with multiple working areas. In one embodiment said optical system is a laser, such as a fibre laser.

Alignment tolerances are often more strict for an reflective optical element relative to a transmissive optical element, as an angular misalignment error between the incoming and the reflected beam will be double that of the angular misalignment error between the beam and the optical component. In contrast an angular misalignment error for a transmissive optical element often results in a parallel displacement of the output beam, which is often less critical. It is therefore surprising that a change in working area is possible while keeping Q substantially unaffected by said movement of the reflective optical component having multiple working areas. Particularly, if the reflected light is to be coupled into an optical fiber, such as a single mode fiber.

In the context of the present invention the terms (optical) beam, light and (optical) beam path are applied in the following manner: In the present context it is assumed that light in the optical system travels in one or more beams when said system is in use. The path drawn by said beam(s) through the optical system is referred to as the beam path. As will be recognized by the skilled person, parts of the beam may be scattered during propagation through the system; however, in one embodiment the beam or beam path should be taken to only mean the beam or beam path along which majority of the light travels. In one embodiment scattered light is included in the beam path when it the scattering affects Q. While light and beams may not be present when the optical system is not in operation, the beam path may in one embodiment be defined as the path along which light would travel when the optical system is in operation. When reference is given to beam and/or light this may in one embodiment be taken to indicate an arrangement of the beam path, e.g. when an angle is specified between the optical component and the impinging light this is equivalent to specifying an angle between optical component and the beam path meeting the optical component. Similarly, in one embodiment the specification of a feature of the light corresponds to a specification of the system being arranged to provide said feature when in operation.

Examples of such systems comprise mode locked lasers, which may utilize a saturable absorber where a high intensity is required in order to provoke the non-linear behaviour of the absorber. As it has been realized by the inventors application of high intensity, e.g. by focusing a beam onto the surface of a saturable absorber, may have a long term destructive impact on the absorber which may significantly contribute to limit the life time of the system. Another example is optical systems comprising frequency doubling via interaction with a non-linear crystal. Again, a relatively high intensity is required to promote the desired non-linear behaviour which in turn limits the lifetime of the crystal and thereby the system. By way of the invention it is now possible to extend the life time of such systems by way of moving the beam to a different working area on the optical component i.e. saturable absorber and non-linear crystal in the two examples, respectively. It has surprisingly been found by the present inventors that such change of working area may be performed without affecting the overall performance of the system significantly.

In the present context the term substantially unaffected is taken to mean the overall performance of the system is substantially unaffected. In one embodiment the term unaffected is taken to mean substantially constant. More specifically and depending on the application and the chosen figure of merit substantially unaffected may be taken to mean a change in Q and/or the coupling efficiency into an optical waveguide of less than or equal to 50%, such as a change in Q of less than or equal to 25%, such as a change in Q of less than or equal to 10%, such as a change in Q of less than or equal to 1%, such as a change in Q of less than or equal to 0.1%, such as a change in Q of less than or equal to 0.01%.

One embodiment of the invention relates to an optical device comprising a support member and a main member in mechanical communication via a deformation member which is deformable, said support member being in direct mechanical communication with an optical component having a work plane comprising a normal vector $\vec{n}$, said plane comprising multiple working areas wherein said device is arranged so that in deformation of the deformation member $\vec{n}$ is substantially constant.

In one embodiment $\vec{n}$ being substantially constant may be taken to mean that the angle θ between $\vec{n}$ pre- and post deformation of the deformation member is less than or equal to 10 degrees, such as less than or equal to 5 degrees, such as less than or equal to 1 degrees, such as less than or equal to 0.5 degrees, such as less than or equal to 0.1 degrees, such as less than or equal to 0.01 degrees.

One embodiment of the invention relates to a method of extending the lifetime of an optical system such as described above comprising utilizing two or more of said working areas in series during the life time of the system substantially without influence from a feedback and/or active alignment.

In the present context interaction with two working areas substantially in series is taken to mean interaction with each working area is separate in time. In one embodiment the change from one area to the second occurs continuously. In one embodiment the change occurs step wise.

Depending on the application one or more of several schemes of changing from one working area to the next may be implemented within the scope of the invention. Examples of such schemes comprise:
  a. determining the performance of the optical component and/or the optical system to obtain at least one performance parameter and using said performance parameter(s) to determine when to change working area,
  b. changing continuously,
  c. changing according to a predetermined time,
  d. changing according to a predetermined time of operation.

In one embodiment of the invention the performance parameter is a parameter relating to the functionality of the optical system. For light sources this may for example be the optical power level for the output, the necessary pump energy required to mode lock a mode locked laser, or other parameters, which depend on the performance of the optical component. In one embodiment the need for a change of working area is determined when the system is in operation but the change it self is performed with the optical system turned off, such as during the next shut-down or start-up of the system. In principle the change from one working area to a second work area may be implemented in any suitable way both with regard to the change itself and with regard to what event(s) (if any) that may trigger the change.

One embodiment of the invention relates to a mode locked laser having a gain medium pumped having a minimal pump power P sufficient to allow the laser to mode lock, said laser comprising an optical component having multiple working areas, said component being mounted on a support member, said laser further comprising an optical beam path arranged to bring light into interaction with at least one working area of the optical component wherein the position of said working area(s) may be selected by relative movement between said path and said component while keeping P substantially unaffected by said movement. In the context of P the term "substantially unaffected" may take any of the meanings ascribed to substantially unaffected for Q above. In one embodiment Q corresponds to the threshold pump power sufficient to maintain mode locking of a mode locked laser. In one embodiment sufficiently unaffected is taken to mean that the risk of Q-switching before and after a movement is substantially constant or reduced, such as constant within less than 20% or reduced, such as constant within less than 10% or reduced, such as constant within less than 5% or reduced, such as constant within less than 20% or reduced, such as constant within less than 1% or reduced, such as constant within less than 0.1% or reduced. In one embodiment the mode locked laser is implemented according to any of the embodiments provided in Danish patent application PA 2007 01814. In this way the invention provides a mode locked laser for providing a pulsed light source, which have many well recognized applications in the art, such as a seed laser for a supercontinuum source or for use with a subsequent frequency quadrupling to create a deep UV source, such as for use in cold ablation, such as for use in the semiconductor industry.

BRIEF DESCRIPTION OF THE DRAWINGS

The invention will be explained more fully below in connection with a preferred embodiment and with reference to the drawings in which.

The figures are schematic and simplified for clarity, and they just show details which are essential to the understanding of the invention, while other details may be left out. Throughout, the same reference numerals are used for identical or corresponding parts. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. Furthermore, as will be realized by a skilled person, features presented relating to one specific embodiment and/or example are generally applicable to other embodiment unless otherwise clear.

DETAILS OF THE INVENTION

As discussed above, the invention relates to devices, systems and methods for extending the life-time of an optical system comprising an reflecting optical component, which has a limited life-time and where changing the position on the component with which the light interacts may extend the life-time. The area on the component with which light interacts is referred to as a working area. In one embodiment of the invention the use of a working area of the optical component comprises a local deterioration substantially limited to the working area, said local deterioration corresponding to a working area life-time. A working area life time would correspond to the life time of the component without implementation of the present invention. If the component is the component limiting the life time of the system of which it is a part of, this component would either have to be exchanged or re-aligned so that the system utilizes a new working area. In one embodiment said working area life-time is less than 20.000 hours, such as 10.000 hours, such as 5.000 hours, such as 1.000 hours, such as 500 hours, such as 100 hours. In one embodiment of the invention a working area of the optical component has a life time in use where said life time is less than the life time of other components of the system, such as more than 50% less, such as more than 75% less, such as more than 90% less. In one embodiment the optical component comprises three or more working areas, such as 10 or more working areas, such as 100 or more working areas, such as 1000 or more working areas, such as 10.000 or more working areas. In one embodiment of the invention the life time of the optical system in operation is extended by a factor of 2 or more, such as a factor of 4 or more, such as a factor of 8 or more, such as a factor of 16 or more, such as a factor of 32 or more, such as a factor of 64 or more, such as a factor of 128 or more, such as a factor of 256 or more, such as a factor of 1064 or more.

To provide similar operation when the working area is changed multiple working areas of the component are preferably substantially equivalent relative to the function which the optical component performs relative to interaction with light in the system. In consideration of the price of a visit by a service technician and the often cumbersome alignment required to exchange components or change working area, implementation of the present invention could provide significant improvements to the use of such optical systems and components.

As discussed previously, components applied as non-linear components are often subjected to high optical peak powers in order to provoke the non-linear effects. Accordingly, in one embodiment of the invention the reflecting optical component has a non-linear response. Therefore, in one embodiment of the invention the optical component is selected from the group of a non-linear optical material, a non-linear optical crystal, a non-linear crystal attached to a mirror, a saturable absorber, a saturable absorbing mirror, a semi-conductor saturable absorber, and a semi-conductor saturable absorbing mirror. However, in some embodiments linear components such as a mirror may also deteriorate over time, so that in some embodiments the optical component is a linear component such as a mirror.

As discussed, the invention is in many embodiments implemented to extend the life time of the system providing relatively similar performance as the working area is changed. However, in some applications the invention may be implemented to switch between substantially different working areas to allow the system to switch between two or more modes of operation. Such working areas could, as an example, comprise two fibres each arranged to guide light differently or towards different components.

Generally speaking the working area may correspond to the spot size of the light on the component when the light and the component interact. However, as most light spots have a spatial dependent power distribution, which decays away from a centre region, definition of a working area with respect to this spatial power distribution could be important to ensure good performance from one working area to the next. Depending on the sensitivity of the component to light exposure a working area is preferably defined so that no or minimal changes in life time occur in the area outside the working area if this area is subject to light corresponding to the light with maximum impact within the working area. Assuming, as an example, a Gaussian circular symmetric spot, then the working area for that spot may be considered to correspond to e.g. the 3 dB width, the 1/e—width of either field or intensity or e.g. the 10dB width of the beam. In one embodiment the working area is considered to interact with over 50% of the optical power of the light interacting with the component, such as more than or equal to 75% of the power, such as more than or equal to 90% of the power, such as more than or equal to 95% of the power, such as more than or equal to 99% of the power, such as more than or equal to 99.9% of the power, such as more than or equal to 99.99% of the power.

As discussed above, in several embodiments of the invention the optical component has a non-linear optical response. Such components are often applied to produce light with specific wavelengths (e.g. through frequency doubling, four-wave mixing etc.) and/or pulsed light such as through a saturable absorber. Such components are often applied in light sources, so that in one embodiment the system of the invention is a light source. In one embodiment the system comprises or is a laser source. In one embodiment said laser is a pulsed laser, such as a mode-locked laser. In one embodiment said laser is applied to pump a non-linear wave-guide, such as a fibre, thereby emitting light in a continuum of wavelengths. In one embodiment the system is a supercontinuum light source. Supercontinuum light sources are known for example from patents such as WO 2005/062113 and chapter 12 and 13 from R. Alfano, "The Supercontinuum Laser Source: Fundamentals with Updated References", Springer, N.Y., USA, 2006. In one embodiment said waveguide may be a microstructured fibre.

Microstructured fibres are sometimes also referred to as photonic crystal fibres (PCFs) or holey fibres (a special case of such fibres is sometimes referred to as photonic bandgab fibre (PBG)). Such fibres and their fabrication are well-known in the art.

Figure 1:
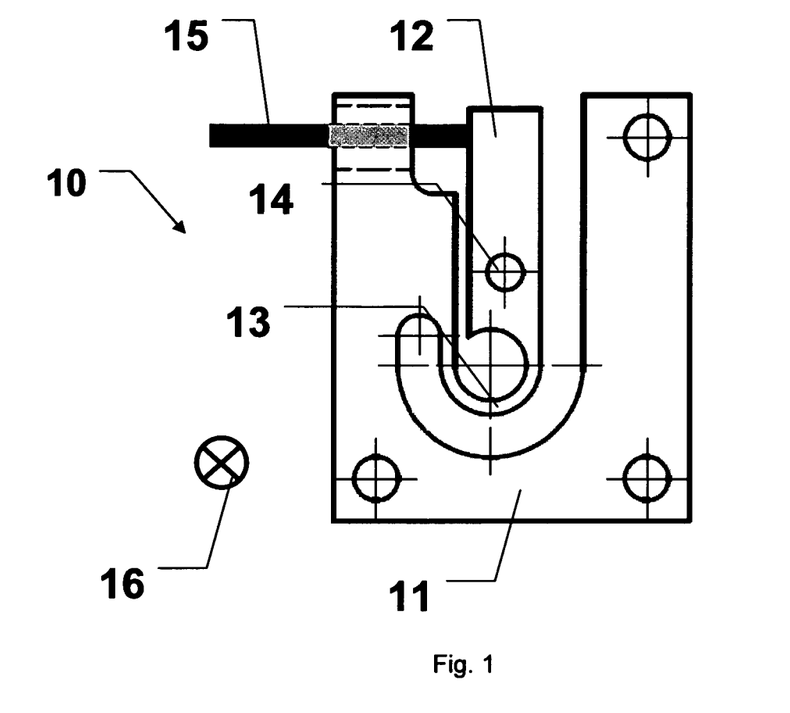
FIG. 1 shows one embodiment of an optical device according to the invention.

FIG. 1 shows one embodiment of an optical device 10 according to the invention, as viewed perpendicularly to the direction of the optical beam path 16 in this case corresponding to the local optical axis. The device comprises a support member 12 and a main member 11 in mechanical communication via a deformation member 13. Said support member 12 may be in direct mechanical communication with an optical component with multiple working areas 14. The term direct mechanical communication is taken to mean that the components are substantially fixed to each other. Thereby any movement of one of the components will be translated substantially directly to the other.

By definition the main member provides at least one anchor point for the deformation member and the main member may comprise multiple parts in mechanical communication and/or fixed together. In one embodiment the main member comprises a mounting plate suitable for mounting multiple other optical components. In one embodiment an entire optical system according to the invention is mounted to the main member.

In one embodiment the deformation member comprises multiple sub components in mechanical communication, such as via a hinge, a chain or similar arranged to allow a controlled movement of a support member.

In one embodiment of the invention the deformation member is deformable by pressure from a pressure member such as the pressure member 15 shown in FIG. 1. Here the pressure member is shown as a rod passing through one side of the main member 11 to allow pressure to be applied to the support member. Such a pressure member may in principle be any device or method suitable for applying pressure to the deformations member, such as screw, a micrometer screw, a piston, and a pneumatic piston. In principle the pressure member may be any means suitable for moving the support member. Accordingly, the pressure member may be arranged to e.g. to pull, push or twist the support member.

In one embodiment the deformation member is produced from a material having a Young's modulus of more than 5 GPa, such as more than 20 GPa, such as more than 40 GPa, such as more than 60 GPa, such as more than 70 GPa, such as more than 80 GPa, such as more than 90 GPa, such as more than 100 GPa, such as more than 110 GPa, such as more than 120 GPa, such as more than 130 GPa, such as more than 140 GPa, such as more than 150 GPa, such as more than 160 GPa, such as more than 170 GPa, such as more than 180 GPa, such as more than 190 GPa, such as more than 200 GPa, such as more than 220 GPa, such as more than 240 GPa, such as more than 260 GPa, such as more than 280 GPa, such as more than 300 GPa, such as more than 350 GPa, such as more than 400 GPa. A stiffer material may allow for a smaller deformation member and a more mechanically stable optical device. This may be utilized to reduce the size of the optical device. However, a softer material may decrease the force necessary to move the support member and may facilitate easier production as a softer material is often easier shaped and manipulated. In one embodiment the deformation member is produced of a material having a Young's modulus of less than 1000 GPa, such as less then 500 GPa, such as less than 400 GPa, such as less than 300 GPa, such as less than 200 GPa, such as less than 100 GPa.

In one embodiment of the invention, such as illustrated by FIG. 1, said pressure member resides in the main member. In one embodiment the pressure member is mounted on the main member. In one embodiment the pressure member is mounted so the main member guides the pressure member, such as exemplified in FIG. 1.

Figure 3A:
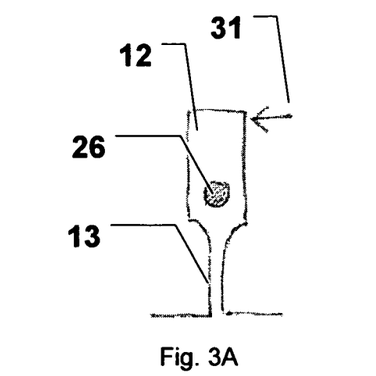
FIG. 3 shows various embodiments of the support and deformation member according to the invention.
Figure 3B:
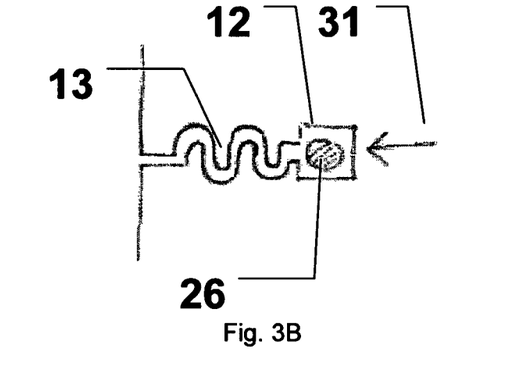
Figure 3C:
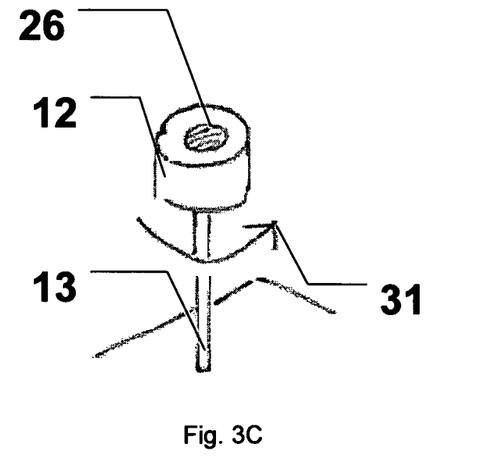

In one embodiment of the invention said pressure member is arranged to apply adjustable pressure to the support member. Such adjustable pressure may in one embodiment be motor controlled, for example by a motor with a latching type arrangement, so the pressure member may stay in one position when there is no power to the motor. In one embodiment the motor is a non-latching type so that the pressure member returns to its resting position when the power is turned off. In principle, depending of the specific design, such as those exemplified in FIGS. 1 and 3, the deformation of the deformation member may be induced by any type of force available such as mechanical force, electromagnetic force, tensile force, compressive force, shear, bending or torsion. FIGS. 3*a*, 3*b* and 3*c* show various embodiments of the support and deformation members suitable for the device according to the invention. In all cases 12 denotes the support member, 26 the optical component, 13 the deformation member and the arrow 31 indicates the axis along which the support 12 may be moved. In FIG. 3A the deformation member is a cantilever arranged to be deformed e.g. by force applied along the arrow 31. In the embodiment of FIG. 3B the deformation member is arranged to be compressed and/or expanded by e.g. by a force applied along the arrow 31. FIG. 3*c* shows an exemplary embodiment where twist or shear is applied to deform the deformation member 13.

In one embodiment the deformation of the deformation member is elastic, so that the deformation member will return substantially to its original shape once relieved of an induced force. In one embodiment the deformation of the deformation member is at least partly elastic, so that the deformation member may not return to its original shape once relieved of an induced force. In one embodiment the deformation of the deformation member is completely plastic so that the deformation member remains in substantially the same shape once relieved of an induced force.

In one embodiment the deformation occurs from within the deformation member such as for a piezoelectric element or a piezo stack, which is deformed by applying a voltage across the element.

In one embodiment of the invention the deformation member has a width measured parallel to $\vec{n}$ and a thickness measured perpendicular to $\vec{n}$ wherein the thickness divided by the width is more than or equal to 1, such as preferably more than 2, such as preferably more than 3, such as preferably more than 4, such as preferably more than 5, such as preferably more than 6, such as preferably more than 7, such as preferably more than 8, such as preferably more than 9, such as preferably more than 10. Such a width may be advantageous as it may provide stability and it may provide a preferential direction for deformation (i.e. normally perpendicular to said width). In one embodiment the width and/or the thickness is less than or equal to 10 mm, such as less than or equal to 10 mm, such as less than or equal to 5 mm, such as less than or equal to 2.5 mm, such as less than or equal to 1 mm, such as less than or equal to 0.5 mm.

In one embodiment, such as that shown in FIG. 1, the deformation member may be a cantilever.

In one embodiment the deformation of the deformation member may be at least partly plastic, so the deformation induced by the pressure member is at least partly permanent.

Commonly the optical component will be arranged for optical interaction with light running parallel to an optical axis and said plane is perpendicular to said optical axis, i.e. the optical axis is parallel to $\vec{n}$. In one embodiment the optical component functions at least partially as a reflector. For such an embodiment an optical axis parallel to $\vec{n}$ being the normal to the reflective surface may provide a reflection substantially along the same optical axis. This may be particularly advantageous for embodiments where the optical component forms one end of a laser cavity.

In one embodiment of the invention the system is arranged so that the beam is focused on the surface of the optical component in which case the spatial distribution of the reflected light may be substantially identical to that of the incoming light if the optical axis is parallel to $\vec{n}$. This may be advantageous when the reflected light is to be coupled to an optical waveguide, such as the fibre, from which it was emitted towards the component. In other embodiments the optical axis forms a non-zero angle to the $\vec{n}$ in which case a constant $\vec{n}$ may provide a constant angle. In one embodiment the reflectivity of the optical component is distributed within the material of the component and/or occurs below the surface of the component.

The component is considered to function as a reflector if the reflected light is at least partially utilized in the system. In one embodiment said component forms one end of a laser cavity. In one embodiment said reflected light is utilized to provide externally locking of a laser cavity.

In one embodiment the optical component has a reflection coefficient of more than or equal to 10%, such as more than or equal to 10%, such as more than or equal to 10%, such as more than or equal to 20%, such as more than or equal to 30%, such as more than or equal to 40%, such as more than or equal to 50%, such as more than or equal to 60%, such as more than or equal to 70%, such as more than or equal to 80%, such as more than or equal to 90%, such as more than or equal to 99%, such as 100%.

In one embodiment said component functions at least partly as a transmissive component where the transmission coefficient is more than or equal to 10%, such as more than or equal to 10%, such as more than or equal to 10%, such as more than or equal to 20%, such as more than or equal to 30%, such as more than or equal to 40%, such as more than or equal to 50%, such as more than or equal to 60%, such as more than or equal to 70%, such as more than or equal to 80%, such as more than or equal to 90%, such as more than or equal to 99%, such as 100%.

Figure 2:
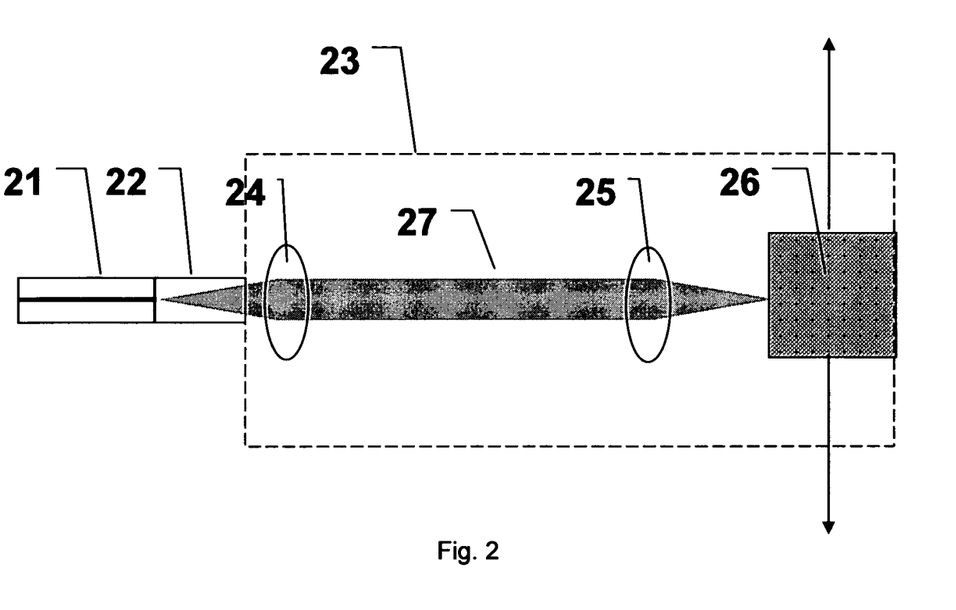
FIG. 2 shows an optical system or a part of an optical system according to the invention. In this embodiment the system is arranged so that light is emitted from an optical waveguide, refracted by a set of lenses, reflected by the optical component and subsequently coupled back into the optical waveguide. In one embodiment said waveguide is an optical fibre, such as a single mode fibre.

FIG. 2 illustrates one embodiment of an optical system or part of an optical system according to the invention. In one embodiment, a system such as shown in FIG. 2 is considered an optical system in itself and in one embodiment it is considered a sub-system to the optical system considered. The exemplary embodiment of FIG. 2 illustrates a system arranged so that light 27 may be coupled from a waveguide into interaction with the optical component 26 and return to the waveguide. In this embodiment light is guided in an optical fibre 21. As illustrated, the glass-air interface that would otherwise exist at the fiber end is terminated by AR-means arranged to reduce back reflections from this interface (e.g. to a level below—20 dB). In FIG. 2 these means are exemplified by a short fibre with substantially constant refractive index spliced onto 21. The constant refractive index is preferably matched to the index of the core of the waveguide, here exemplified by an optical fibre. This piece of fibre is often termed an end cap. Since the end cap has a substantially constant refractive index the beam emitted from the waveguide will diverge inside it. The length of the fibre 22 may be chosen so the beam diameter, e.g. defined by the 1/e value of the intensity, at the end facet is significantly smaller than the fibre diameter. Hence it may provide low loss in transmission as the beam does not expand substantially beyond the radial limits of the fibre. The length of the fibre 22 may also be chosen so the beam diameter of the light after being transmitted through the fibre and reflected at the interface to air is significantly larger than the beam diameter at the endface of 21. This may provide the desired low back reflection. For a system operating at 1064 nm this can e.g. be achieved by using a 0.35 mm long fibre with a diameter of 0.14 mm. Other AR-means may include angle cleaving of the end face of the waveguide 11, AR coating of the end face or similar measures known in the art. Similarly, other shapes than a fibre may be applied along the same principles. Furthermore persons skilled in the art will realise that the feature of providing a reduced back reflection may be used in any embodiment of the invention comprising an optical glass to air interface.

In one embodiment the fibre termination 22 is fixed to a housing unit outlined as element 23 for example via an adhesive. In general it may be preferable to fix one or more of the elements of the system to the same housing as this may improve the mechanical stability of the optical system.

In one embodiment of the invention the optical system comprises an imaging system for focusing light onto the optical component 26. In one embodiment the imaging system may comprise a pair of lenses such as 24 and 25.

In one embodiment the housing, parts of the housing and/or the optical device are made of one or more materials having a relatively low linear thermal expansion providing stability relative to thermal variations. In one embodiment relatively low linear thermal expansion is taken to mean less than $100 \cdot 10^{-6}$/K, such as less than or equal to $100 \cdot 10^{-6}$/K, such as less than or equal to $75 \cdot 10^{-6}$/K, such as less than or equal to $50 \cdot 10^{-6}$/K, such as less than or equal to $25 \cdot 10^{-6}$/K, such as less than or equal to $10 \cdot 10^{-6}$/K, such as less than or equal to $5 \cdot 10^{-6}$/K, such as less than or equal to $1 \cdot 10^{-6}$/K. However, in one embodiment it was found that an optical device of FIG. 1 produced in aluminium were sufficiently stable to provide the results of FIG. 6. In this embodiment aluminium had a linear thermal expansion coefficient of about $23 \cdot 10^{-6}$/K.

In one embodiment the thermal expansion coefficients of two or more of components that are fixed together are matched in order to ensure stability and durability relative to changes in temperature. In one such embodiment the housing 23 is manufactured at least partly in a steel material having a thermal expansion coefficient substantially matching that of silica which is commonly the material of choice of e.g. lenses, glass plates, fibres and mirrors. In one embodiment the thermal expansion coefficients match within 20%, such as within or equal to 15%, such as within or equal to 10%, such as within or equal to 5%, such as within or equal to 1%, such as within or equal to 0.5%. Alternatively or in combination one may incorporate a thermal expansion buffer that may at least partly absorb a mismatch in thermal expansion coefficients. In one embodiment a fixing adhesive arranged to fix two components together perform this function.

In one embodiment the optical device according to the invention is placed inside the housing unit or as a part of the housing unit.

In one embodiment the optical device according to the invention is placed outside the housing unit to which it is mechanically fixed e.g. by fasteners such as screws, bolts or similar. In one such embodiment it is not critical whether or not the optical device and the housing have matched coefficients of thermal expansion. For example it was found that one implementation where the housing was made of steel, the optical device of aluminium and the two were screwed together was sufficiently stable to provide the results of FIG. 6. Steel and aluminium have a linear thermal expansion coefficient of about $10 \cdot 10^{-6}$/K and $23 \cdot 10^{-6}$/K, respectively.

In one embodiment the selection of a work area may be performed by moving the optical component perpendicularly to the optical axis of the light impinging on the optical component, this is exemplified in FIG. 2 by the arrows shown. In general the phrase "light impinging on the optical component" refers to the part of the beam path immediately before the light hits the optical component. This light impinging on the optical component will have a direction of propagation and a centre of gravity of the intensity distribution in the plane perpendicular to said direction of propagation. The line along said direction of propagation intersecting said centre of gravity is defined as the local optical axis or just optical axis of the light impinging on the optical component. Often the beam will exhibit some degree of rotational symmetry around the optical axis but this is not required in the present application.

As mentioned above embodiments of the system according to the invention may comprise an imaging system to image light onto the optical component. An example of such system is provided by the imaging system comprising the pair of lenses shown in FIG. 2. Here the first lens collimates the output from the waveguide 11, and the second lens focuses the beam onto the surface of the optical component. Another suitable example of an imaging system could comprise a single lens where the optical component and the end facet of the waveguide may be placed near the focal length on either side of said lens. In most embodiments of the invention the optical components in an imaging system are preferably AR coated to reduce stray reflections.

An alternative approach to achieving a relatively small spot size, and thereby a higher optical intensity, on the optical component is to butt couple the waveguide to the optical component. Accordingly, in one embodiment the beam path comprises an optical waveguide, such as an optical fibre, to which said component is butt coupled. In the context of the present invention the term butt coupling is understood broadly so that the waveguide and the optical element are not strictly required to have contact. In one embodiment it is preferable that there is a free-space gap between the waveguide and the optical component so that the waveguide may be moved relative to the optical component without friction. Normally the light field will diverge upon exit from the waveguide so a small distance is often preferable to enable reflection of the field back into the waveguide with little loss. In one embodiment this gab is less than 1 mm, such as less than 500 µm, such as less than 250 µm, such as less than 100 µm, such as less than 50 µm, such as less than 25 µm, such as less than 10 µm. The reference to the optical beam path comprising components, such as an optical waveguide, refers to the optical beam interacting, penetrating, being guided by, transmitted through and/or reflecting off said component.

FIGS. 8 to 11 show different embodiments of the optical device system 80 according to the invention. In all of these figures the different parts of the invention are separated for clarity. However, they may be fixed together in order to improve mechanical stability.

Figure 8:
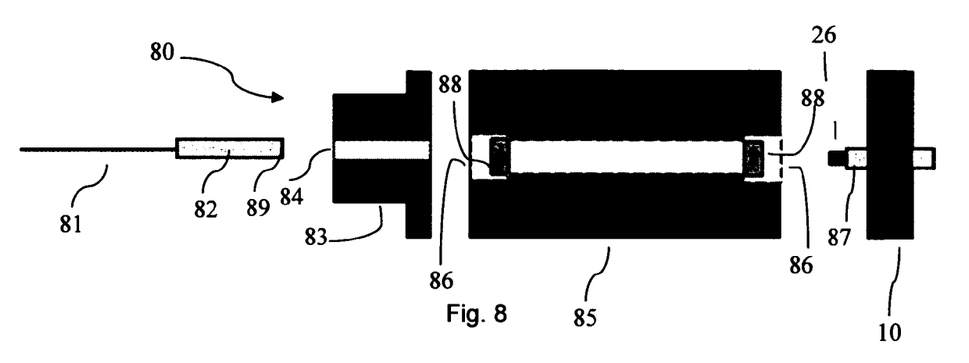
FIG. 8 shows an optical system according to the invention where a ferrule is mounted at the end of the optical fibre. The ferrule may be glued inside a ferrule holder that is again glued to a housing unit containing an imaging system. The housing unit is glued or mechanically fastened to the optical device according to the invention.

In FIG. 8 the optical fiber 81 is mounted inside a ferrule 82. The ferrule may be pushed inside an opening 84 of the ferrule holder 83, to which it may subsequently be fixed. The ferrule holder may be fixed to a housing unit 85, which contains an imaging system comprising at least one lens 88. In one embodiment said lens 88 is placed in the lens holder section 86. The reflective optical component 26 is fixed to a holder 87, which is again fixed to the optical device 10 of the invention. The optical device may in one embodiment be of the type shown in FIG. 1 or 3 and it may in one embodiment be fixed to the housing unit. In one embodiment the lens holder section 86 may provide sufficient spacing for the reflective optical component 26 and the holder 87 so that the optical device 10 may be brought in contact with the housing 85. In one embodiment the lens holder section further allows for movement of the reflective optical component to allow for a change of work area. Bringing the optical device 10 in contact with the housing has in one embodiment the advantage of enclosing the reflective optical device thus shielding it from dust and other contaminants. By designing the housing 85, the optical device 10 and/or the holder 87 the spacing between the lens 88 and the optical component 26 may be set by design. In one embodiment it is advantageous to design said spacing so the lens 88 and the optical device 26 cannot inadvertently meet. In one embodiment the spacing corresponds to the focal length of the lens. In one embodiment said spacing is in the order of a few millimeters, such as longer than 0.1 mm, such as longer than 1 mm, such as longer than 2 mm, such as longer 3 mm, such as longer than 4 mm.

Figure 9:
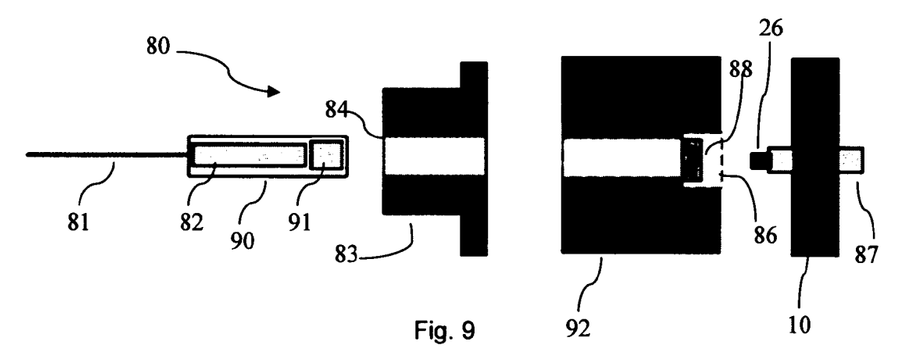
FIG. 9 shows an optical system according to the invention where the ferrule at the end of the optical fiber contains a lens.

FIG. 9 shows one embodiment where the ferrule 82 on the optical fibre and a lens 91 are integrated in an optical house 90. By integration of a lens, the optical beam after the optical house may be changed according to the choice and position of said lens. In one embodiment the lens in the optical house 91 is arranged to focus the beam onto the reflective optical component 26 via a lens 86 mounted in the housing 85. In one embodiment the lens 91 is arranged to collimate the beam. In one embodiment the lens 91 is arranged to focus the beam. The optical house may be glued inside the ferrule holder 83, which again may be glued or otherwise fixed to a housing unit 92. Similarly to the embodiment in FIG. 8 the optical device may in one embodiment be brought in contact with the housing 92.

Figure 10:
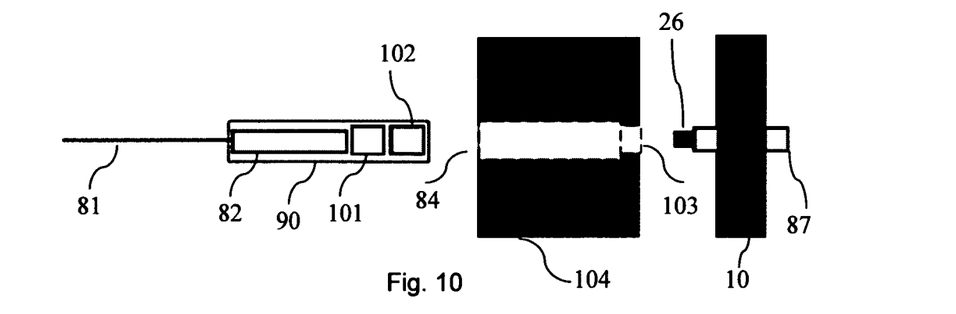
FIG. 10 shows an optical system according to the invention where the ferrule at the end of the optical fiber contains an imaging system consisting of two lenses.

FIG. 10 shows one embodiment where the optical housing 90 contains two lenses 101 and 102. In this embodiment the light beam path after the optical house may be changed according to the choice and position of the lenses. In one embodiment the lenses 101, 102 in the optical house are arranged to focus the beam onto the reflective optical component 26. In one embodiment the lenses inside the optical housing are identical and their position is chosen to enable a 1:1 imaging. In one embodiment the optical housing is inserted in the housing 104, which may be fixed directly to the optical device 10. The housing may contain a section 103 having a smaller dimension than the optical housing, whereby it may determine the position of the end of the optical housing. Thus the length of the section 103 may be chosen to ensure a specific property of the beam at the reflective optical component. In one embodiment the length of the section having smaller dimension is chosen so that the beam is focused on the optical component 26. Similarly to the embodiment in FIGS. 8 and 9 the optical device may in one embodiment be brought in contact with the housing 92. Here the section 103 may be designed to allow the insertion of the reflective optical component 26 and the holder 87. In one embodiment it is advantageous to design the housing 104 so the optical housing 90 and the optical device 26 cannot inadvertently meet.

Figure 11:
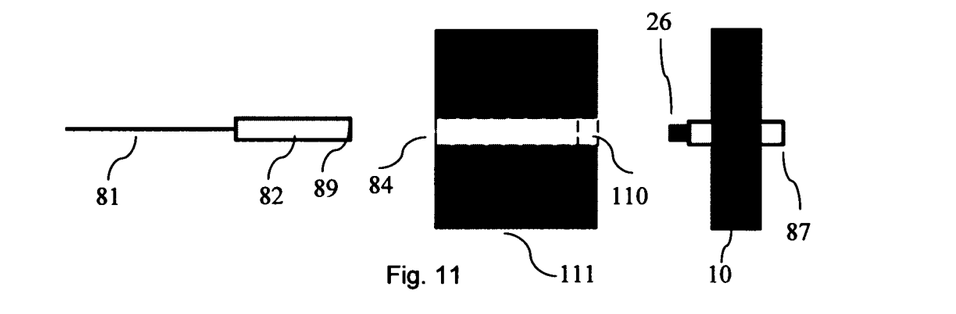
FIG. 11 shows an optical system according to the invention where the ferrule at the end of the optical fiber is to be butt coupled to the optical component.

FIG. 11 shows one implementation of the optical device system in which the optical fibre is butt-coupled to the optical component. The ferrule 82 is inserted into the housing 111, so that it is butt coupled to the optical component. Similarly to the embodiments of FIGS. 8-10 it may in one embodiment be preferable that there is a free-space gap 110 between the fibre and the optical component so that they may be moved relative to each without friction or danger or scratching each other. However, to minimize loss it may in one embodiment be preferable to bring the optical component 26 and the fiber is close to one another as possible. In one embodiment the spacing of the end facet of the fiber 89 and the optical component 26 is less than 500 µm, such as less than or equal to 250 µm, such as less than or equal to 100 µm, such as less than or equal to 50 µm, such as less than or equal to 25 µm, such as less than or equal to 10 µm. The obtainable spacing is in one embodiment dependent on the flatness of the optical component 26.

Figure 4:
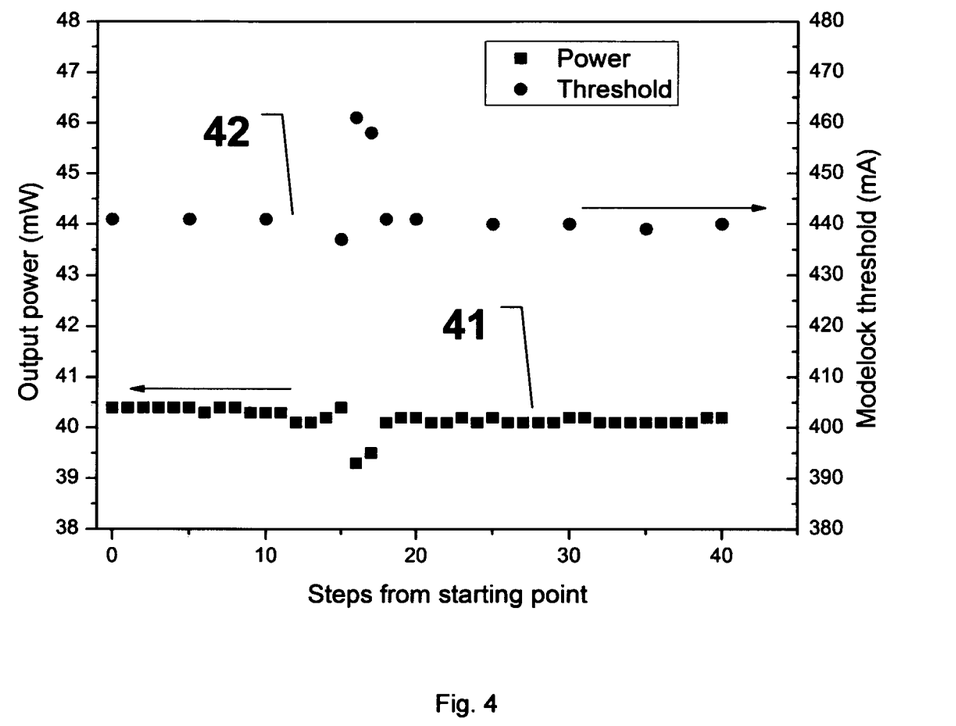
FIG. 4 illustrates the uniformity achieved by the invention when incorporated in a mode locked laser.

FIG. 4 illustrates the uniformity achieved by the invention. The optical device of FIG. 1 was implemented in the seed laser of the light source discussed in FIG. 7. The seed laser is based on a linear mode locked laser cavity with a semiconductor saturable mirror (SESAM or just SAM) forming one end of the cavity. A system such as illustrated in FIG. 2 is implemented to focus intra-cavity light onto the SAM and the remaining cavity is based on single mode fibre. The optical device holds the SESAM so that different working areas may be utilized. In this embodiment a step motor controls the pressure member so that movement of the SAM is larger than the optical spot size on the SAM. Accordingly each step provides a fresh working area on the SAM. FIG. 4 shows the laser output power 41 and the pump laser current at the mode lock threshold 42, vs. the number of steps from the starting point. It is believed that the deviations for spots 16 and 17 are caused by defects on the SAM. It is seen that the system is surprisingly stable with the threshold varying between 435 mA and 445 mA, i.e. about 2%, and the output varying between 40 and 40.5 mW, i.e. about 1%, even though no active alignment or feedback has been applied to ensure accurate coupling to the single fibre when the SAM is moved.

Figure 5:
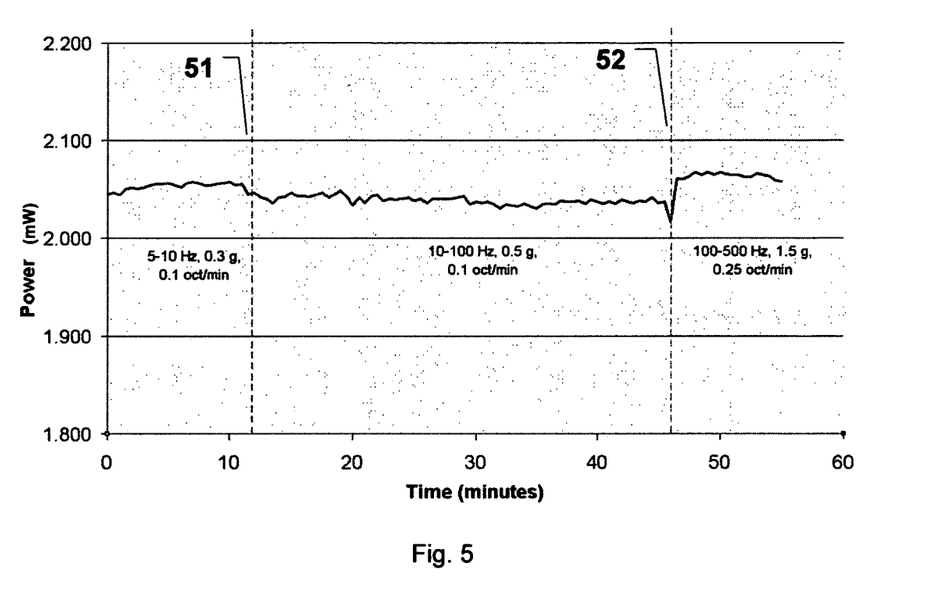
FIG. 5 shows the stability of an embodiment according to the invention when this is subjected to a vibrations test.

FIG. 5 shows graphs from a stability test of one embodiment of the invention. A mode-locked laser operating at 1064 nm was constructed with a cavity defined by a fibre Bragg grating in one end and a SESAM in the other implemented with the imaging system shown in FIG. 2 and the optical device shown in FIG. 1. The fibres used for the cavity were all single mode fibres. The pump diode was run 5% over the lasers threshold for mode locking and a shake test was performed while the output power of the laser was monitored. Three subsequent shake tests were performed where vibrations were induced along the optical axis and in the horizontal and vertical plane perpendicular to the optical axis, respectfully. All tests showed similar small variations in the output power. Each shake test consisted of three stages as described in the table below. The transition between stage 1 and stage 2 is marked on FIG. 5 as 51. The transition between stage 2 and stage 3 is marked on FIG. 5 as 52. From FIG. 5 it is seen that the principles of the present invention provide a stable optical system where, in this case, the optical power fluctuates in the order of less than 1% when subjected to a vibrations test. This is relatively surprising when considering that the SESAM was implemented mounted on a cantilever deformation member and a free space optical coupling where light reflected back from the SESAM was re-coupled to a single mode fibre. Such a coupling is in itself normally considered a sensitive coupling in the art.

|  | Frequency | Vibration | Average output power[mW] |
| --- | --- | --- | --- |
| Stage 1 | 5-10 Hz | 0.3 g, 0.1 oct/min | 2.055 |
| Stage 2 | 10-100 Hz | 0.5 g, 0.1 oct/min | 2.039 |
| Stage 3 | 100-500 Hz | 1.5 g, 0.25 oct/min | 2.060 |

Figure 6:
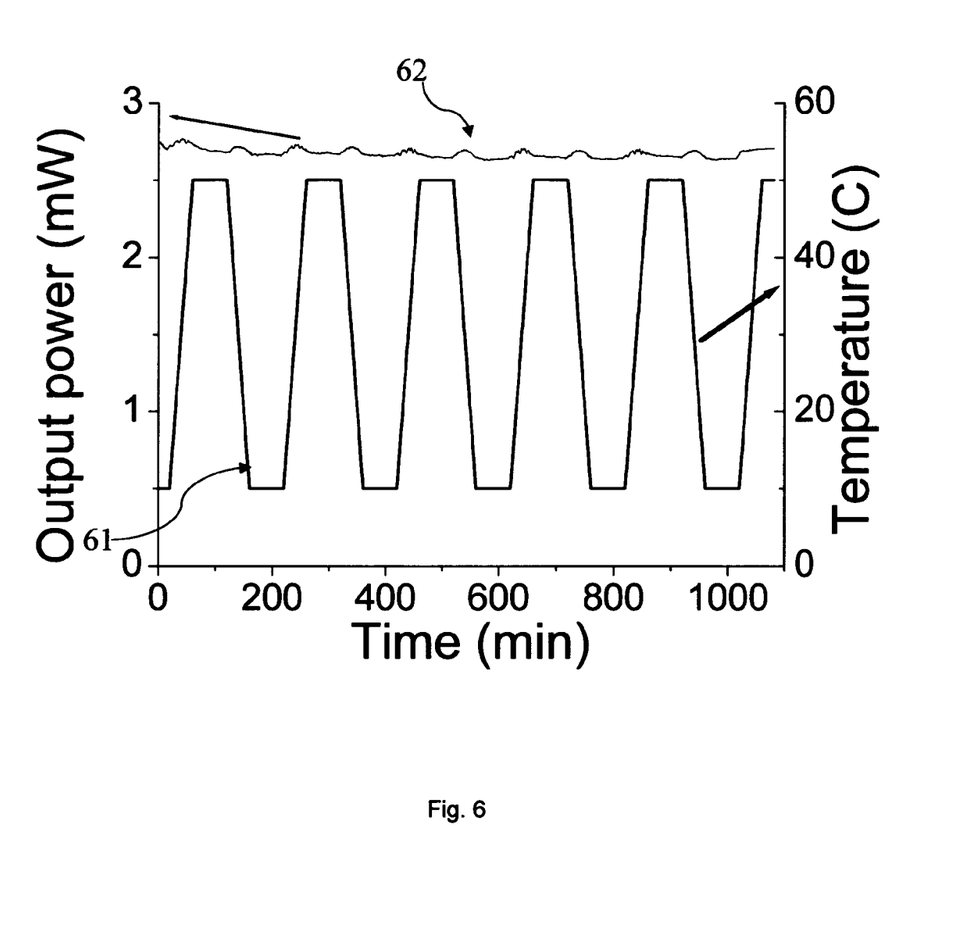
FIG. 6 shows the stability of an embodiment according to the invention when this is subjected to a temperature test.

FIG. 6 shows a graph from a temperature test of the system discussed in relation to FIG. 5. The imaging system was fixed in the main member and the fibre emitting light towards the SESAM was fixed to a glass plate glued in its circumference to the main member. To ensure temperature stability a selection of a material for the glass plate and the housing unit was performed to achieve a close match in thermal expansion coefficients. The glass plate was manufactured from Schott B270 SUPERWITE® by the company UQG LTD, Cambridge, England, and the housing unit was produced from BÖHLER M310 ISO PLAST steel. The glass is quoted by the manufacturer to have a thermal expansion coefficient of $9.4 \cdot 10^{-6}$/K and the steel is quoted to have a thermal expansion coefficient of $10.5 \cdot 10^{-6}$/K, i.e. a mismatch of about 10%. The optical device according to the invention was made in aluminum having a thermal expansion coefficient of $23 \cdot 10^{-6}$/K and was mechanically fastened to the housing unit by screws.

The pump diode was run 5% over the lasers threshold for mode locking and the laser was placed in a climate chamber. The temperature was then varied between 10 C and 50 C as shown in FIG. 6, 61. During this the laser was run and the optical output power was logged, 62. FIG. 6 shows that the fluctuations in temperature only led to minor variations in the laser output power. The maximum deviation is <2% from the average value. In one embodiment of the invention the output is sufficiently stable when so the system may be exposed to temperature changes, vibrations and/or shock without Q-switching. In one embodiment the said temperature changes, vibrations and/or shock falls within the requirement of standard tests in the field of light sources or lasers, such as test standards provided by Telcordia Technologies Inc. or requirements often required in the field. Such requirements correspond to what the system may reasonably experience during use when placed in a laboratory or a factory. In this context the term sufficiently stable is taken to mean a variance of less than 25%, such as less than or equal to 10%, such as less than or equal to 5%, such as less than or equal to 1%, such as less than or equal to 0.1%.

Figure 7:
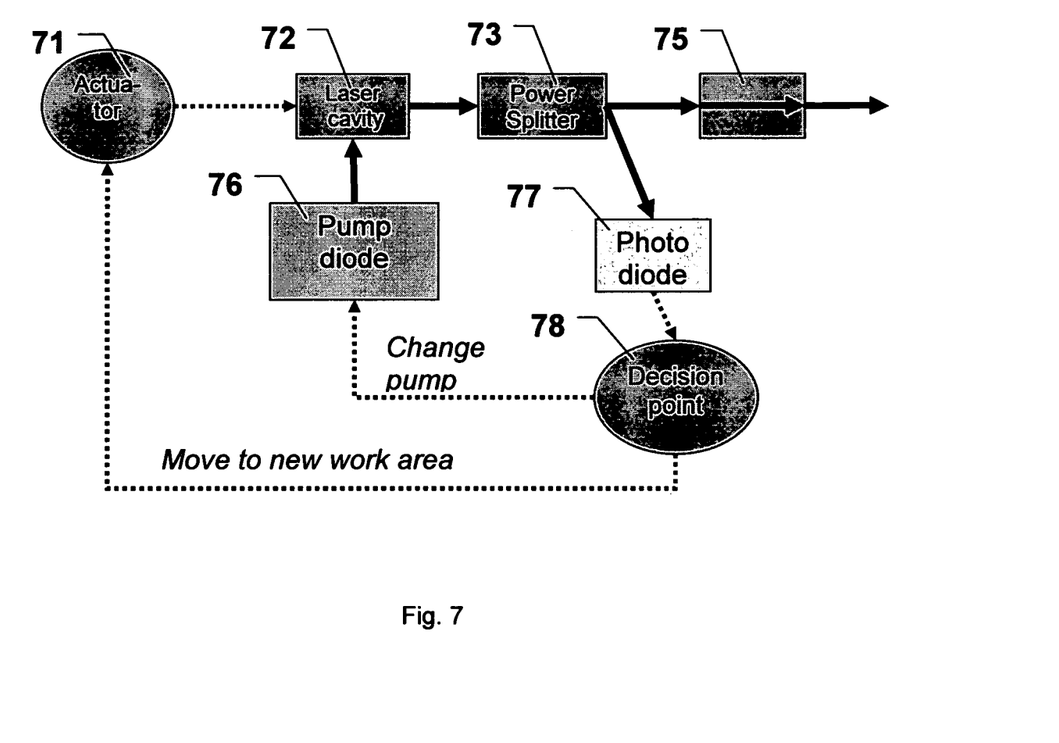
FIG. 7 shows one embodiment of the invention where the optical system comprises a laser and an electrical monitor system. Full lines indicate an optical connection and dotted lines an electrical connection.

FIG. 7 shows one embodiment of the invention where the optical system comprises a laser and an electrical monitor system. Full lines indicate an optical connection and dotted lines an electrical connection. The laser cavity 72 is formed by the mode-locked laser discussed in FIGS. 4 to 6, where the gain medium is optically pumped by a diode 76. The optical output from the laser is divided into two parts by a power splitter. One part passes through an optical isolator 75. The second part is directed to a photodiode 77. The electrical output from the photodiode is directed to a decision point 78 comprising programmable decision and control circuits. Based on the input to this point, an electrical signal may be sent to the pump diode and/or an actuator 71, which may be capable of moving the optical component to a new working area. Depending on the application the control point may be programmed to detect one or more of several possible indicators.

In many applications of the invention the optical system comprises a pulsed laser. Here it may be essential either to avoid Q-switching or to provide Q-switching of the laser cavity. In an embodiment where the optical system is a mode-locked laser it may be essential to prevent Q-switching or at least to recognize when the laser is Q-switching instead of mode locking. Q-switching may be undesirable as a high powered pulse from a Q-switching event may be destructive to optical components handling the output of the laser and/or the subject onto which the laser light may be applied. In one embodiment the control point monitors whether the laser is mode-locked by detecting the AC part of the electrical signal within a frequency band comprising the expected repetition rate of the mode-locked laser. If the laser does not mode-lock, the decision point may select to increase pumping of the gain medium. In the embodiment of FIG. 7 this would correspond to increasing the current driving the pump diode. In one embodiment the decision point may select to change working area on the optical component, such as moving a SESAM forming one end point of the laser cavity. In one embodiment both choices are open to the decision point. In one embodiment the decision point may be allowed to decide to move the optical component if the pump power required for mode locking suggests that a bad working area on the optical component is chosen. Examples of such bad working areas were discussed in regard to FIG. 4.

In one embodiment the system is arranged so that light, post interaction with said working area, is coupled into an optical waveguide with a coupling efficiency C, wherein said coupling efficiency C is substantially unaffected by the movement from one working area to a second working area. In one embodiment C is defined as the percentage of the optical power coupled to the supported mode(s) of said waveguide. In one embodiment the coupling is defined as the percentage of the optical power coupled to the fundamental mode of said waveguide. In the context of C the term "substantially unaffected" may take any of the meanings ascribed to substantially unaffected for Q above.

In one embodiment of the invention the spatial location of the beam path is substantially unaffected by the movement of the optical component. Such a stability is likely to ensure that the remaining components of the optical system will be unaffected by the movement of the optical component. In one embodiment the part of the beam path for which the spatial location is substantially unaffected comprises the part of the beam path meeting the optical component. In one embodiment the work area is selected at least partly by movement of the beam path. In one embodiment the part of the beam path for which the spatial location is substantially unaffected does not comprise the light impinging on the optical component. In one such embodiment a part of the optical beam path is in a waveguide, such as an optical fibre, having a first end. The position and/or orientation of said first end may be altered to select the working area. In one embodiment the light returns to said waveguide after interaction with the optical component. In one embodiment only the optical beam path outside and close to the end facet inside said waveguide is altered while the remaining beam path may be stationary.

In one embodiment the stability of the system in relation to a movement of the optical component is obtained substantially without influence from a feedback and/or active alignment. In this context feedback refers to a closed loop adjustment of the position and/or spatial orientation of the optical component or the beam impinging on the component e.g. by adjusting the position and/or spatial orientation of other components in the optical system. Active alignment refers to an operator controlled alignment of the optical component and/or impinging beam. In one embodiment feedback and/or active control may be implemented; however, the contribution from either is unnecessary relative to achieving the required stability of Q, C or spatial location of the beam path. In one embodiment of Q, C or spatial location of the beam path are influenced less than 25% by feedback and/or active alignment, such, such as influenced less than 15%, such as influenced less than 10%, such as influenced less than 5%, such as influenced less than 1%. In one embodiment substantially without feedback does not refer to a feedback system arranged to change working area on the optical component. For an optical component where the working areas are arranged in the same plane, such as a mirror, such feedback system is arranged to adjust the position of the optical component (or the beam path) in a plane substantially perpendicular to the impinging beam.

In one embodiment substantially unaffected means substantially constant. In one embodiment Q is constant to within less than 50%, such as less that 25%, such as less that 10%, such as less that 5%, such as less that 1%, such as less that 0.1%, such as less that 0.01%, such as less that 0.001%. In this context constant relates to the value of Q before and after a movement of an optical component.

In one embodiment the figure of merit Q is selected from the group of a Q-value for a laser, the optical power of the output (AC and/or DC value), $M^2$ value of the output light, the spectral width of the output light, the mode-locking pump power threshold and the centre wavelength of the output light.

In several of the embodiments discussed above reference has been made to movement of the optical component. However, movement of the beam directed to the optical component or movement of both the beam and the optical component may provide an equivalent result. Such movements are therefore intended to fall with the scope of invention when reference is made to movement of the optical component.

The invention has been discussed in the foregoing at least partly by way of exemplary embodiments, which must not be taken to limit the invention as defined by the attached set of claims. Furthermore, it should be noted that any reference to numerals provided in the claims are exemplary only and should not be considered to limit the claim.

The invention claimed is:

1. An optical system arranged to provide an output which in operation comprises at least one figure of merit, Q, said system comprising:
    a laser source comprising a laser cavity, the laser cavity including a reflecting optical component forming one end of the laser cavity,
    said reflecting optical component has a non-linear optical response and has multiple working areas, said reflecting optical component being mounted on a support member such that the support member is in direct mechanical communication with said reflecting optical component,
    said optical system further comprising an optical beam path arranged to bring light into interaction with at least one working area of the reflecting optical component,
    wherein a position of said working area(s) is determined by relative movement between said optical beam path and said support member while keeping Q substantially unaffected by said movement.

2. The optical system of claim 1, wherein having Q substantially unaffected by said movement is obtained with said movement substantially without influence from a feedback or active alignment.

3. The optical system of claim 1, where the system is arranged so that light, post interaction with said working area, is coupled into an optical waveguide with a coupling efficiency C, wherein said coupling efficiency C is substantially unaffected by said movement.

4. The optical system of claim 1, wherein said waveguide is an optical fibre.

5. The optical system of claim 1, wherein the spatial location of said beam path is substantially unaffected by said movement.

6. The optical system of claim 1, wherein said laser is a pulsed laser.

7. The optical system of claim 1, wherein said laser is a fiber laser.

8. The optical system of claim 1, wherein the reflecting optical component is selected from the group of a non-linear optical material, a non-linear optical crystal attached to a mirror, a saturable absorber, a saturable absorbing mirror, a semi-conductor saturable absorber, and a semi-conductor saturable absorbing mirror.

9. The optical system of claim 1, wherein said beam path is arranged to focus light onto said reflecting optical component.

10. The optical system of claim 1, wherein said beam path comprises an optical fibre, and further comprises an imaging system focus light emitted from a first end of the said optical waveguide onto said reflecting optical component.

11. The optical system of claim 10, further comprising AR-means for minimizing end reflections of said first end.

12. The optical system of claim 1, wherein said beam path comprises an optical fibre, to which said reflecting optical component is butt coupled.

13. The optical system of claim 1, wherein said figure of merit is the Q-value for a laser.

14. The optical system of claim 1, wherein said figure of merit Q is the $M^2$ value of the output light.

15. The optical system of claim 1, wherein said figure of merit Q is the spectral width of the output light.

16. The optical system of claim 1, wherein said laser pumps a non-linear fibre emitting light in a continuum of wavelengths.

17. An optical device comprising:
a support member, a main member, and a deformation member, the support member and the main member in mechanical communication via the deformation member which is deformable,
said support member being in direct mechanical communication with a non-linear optical component arranged for optical interaction with light running parallel to an optical axis,
said optical component having a work plane comprising a normal vector $\vec{n}$ parallel to said optical axis, said work plane comprising multiple working areas each having a normal vector $\vec{n}$ parallel to said optical axis,
wherein said device is arranged so that when deformation of the deformation member occurs, $\vec{n}$ is substantially constant and the deformation member has a width measured parallel to $\vec{n}$ and a thickness measured perpendicular to $\vec{n}$ wherein the thickness divided by the width is more than 1 and wherein the direction for deformation is perpendicular to said width.

18. The optical device of claim 17, wherein the use of a working area of the optical component comprises a local deterioration substantially limited to the working area, said local deterioration corresponding to a working area life-time.

19. The optical device of claim 17, further comprising a pressure member arranged to deform the deformation member and said pressure member is arranged to apply adjustable pressure to the support member.

20. A method of extending the lifetime of an optical system according to claim 1, comprising utilizing two or more of said working areas in series during the life time of the system substantially without active alignment.

21. The optical system of claim 1, wherein said waveguide is a single mode optical fibre.

* * * * *